United States Patent
Jasinski

(10) Patent No.: US 10,221,913 B2
(45) Date of Patent: Mar. 5, 2019

(54) HYDRAULIC DAMPER WITH A PISTON ROD PROTECTIVE TUBE

(71) Applicant: BeijingWest Industries Co., Ltd., Beijing (CN)

(72) Inventor: Mateusz Jasinski, Podgorki (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/597,060

(22) Filed: May 16, 2017

(65) Prior Publication Data

US 2017/0363170 A1  Dec. 21, 2017

Related U.S. Application Data

(60) Provisional application No. 62/352,737, filed on Jun. 21, 2016.

(51) Int. Cl.
  *F16F 9/36* (2006.01)
  *F16F 9/38* (2006.01)
  (Continued)

(52) U.S. Cl.
  CPC .............. *F16F 9/38* (2013.01); *B60G 15/063* (2013.01); *B60G 15/066* (2013.01); *F16F 9/185* (2013.01);
  (Continued)

(58) Field of Classification Search
  CPC ...... F16F 9/38; F16F 9/58; F16F 9/185; F16F 13/06; B60G 15/063; B60G 15/066;
  (Continued)

(56) References Cited

U.S. PATENT DOCUMENTS 5,535,862 A * 7/1996 Jentsch .................... F16F 9/585
                                                        188/284
6,199,844 B1 * 3/2001 McCormick ......... B60G 13/003
                                                        267/140
(Continued)

FOREIGN PATENT DOCUMENTS

CN        1576638 A      2/2005
CN      201513512 U      6/2010
(Continued)

OTHER PUBLICATIONS

Extended Search Report dated Nov. 14, 2017 for counterpart European Application No. EP17001032.6, 8 pages.
(Continued)

*Primary Examiner* — Christopher P Schwartz
(74) *Attorney, Agent, or Firm* — William H. Honaker; Dickinson Wright PLLC

(57) ABSTRACT

The present invention relates to a hydraulic damper for a motor vehicle, comprising a tube with a slidably piston assembly attached to an end of a piston rod that is led outside the tube through a rod guide. A protective cap surrounds a portion of the tube. A partially axially elastic protective tube is attached to the cap and surrounds it and the piston rod. The cap is a unitary plastic component and has an annular flange provided with locking means attaching it to the protective tube. The cap has a plurality of spaced axial ribs separated by axial slots and joining a cylindrical section of the cap with the flange. A plurality of auxiliary ribs join the axial ribs and the annular area of the axial slots is larger than the total annular area of the axial ribs and the auxiliary ribs combined.

9 Claims, 3 Drawing Sheets

(51) Int. Cl.
    *B60G 15/06*   (2006.01)
    *F16F 9/18*    (2006.01)
    *F16F 13/06*   (2006.01)
    *B60G 13/08*   (2006.01)

(52) U.S. Cl.
    CPC .............. *F16F 13/06* (2013.01); *B60G 13/08* (2013.01); *B60G 2204/40* (2013.01); *F16F 2222/12* (2013.01); *F16F 2224/02* (2013.01); *F16F 2226/04* (2013.01)

(58) Field of Classification Search
    CPC .............. B60G 15/12; B60G 2202/312; B60G 2204/128; B60G 2204/1242
    USPC ................................. 267/120, 122, 220, 221; 188/322.16–322.17; 280/124.146, 280/124.147
    See application file for complete search history.

(56) References Cited

U.S. PATENT DOCUMENTS

| | | | |
|---|---|---|---|
| 6,217,012 B1* | 4/2001 | Hashirayama | B60G 15/063 |
| | | | 188/322.17 |
| 7,032,896 B2* | 4/2006 | Collis | F16F 9/38 |
| | | | 188/322.17 |
| 9,611,913 B2* | 4/2017 | Nagai | F16F 9/38 |
| 2002/0189441 A1 | 12/2002 | Collis et al. | |
| 2016/0089952 A1* | 3/2016 | Kato | F16F 9/38 |
| | | | 267/292 |

FOREIGN PATENT DOCUMENTS

| | | | |
|---|---|---|---|
| CN | 201786983 U | 4/2011 | |
| CN | 203784183 U | 8/2014 | |
| DE | 9109020 U1 | 10/1991 | |
| DE | 10122796 A1 | 12/2002 | |
| DE | 102009016210 A1 | 10/2010 | |
| DE | 102009030591 A1 | 2/2011 | |
| DE | 102011102466 A1 | 5/2012 | |
| DE | 10201303026 A1 | 1/2014 | |
| DE | 102013203026 A1 | 1/2014 | |
| EP | 2070738 A2 | 6/2009 | |
| FR | 3027084 A1 | 4/2015 | |
| JP | 2007057088 A | 3/2007 | |
| JP | 2007198512 | * 8/2007 | ............... F16F 9/38 |
| JP | 2009222223 A | 10/2009 | |
| KR | 20100137266 A | 12/2010 | |
| WO | 2008037319 A1 | 4/2008 | |

OTHER PUBLICATIONS

First Office Action and Search Report dated Aug. 27, 2018, for counterpart Chinese Patent Application No. 201710356546.4.

* cited by examiner

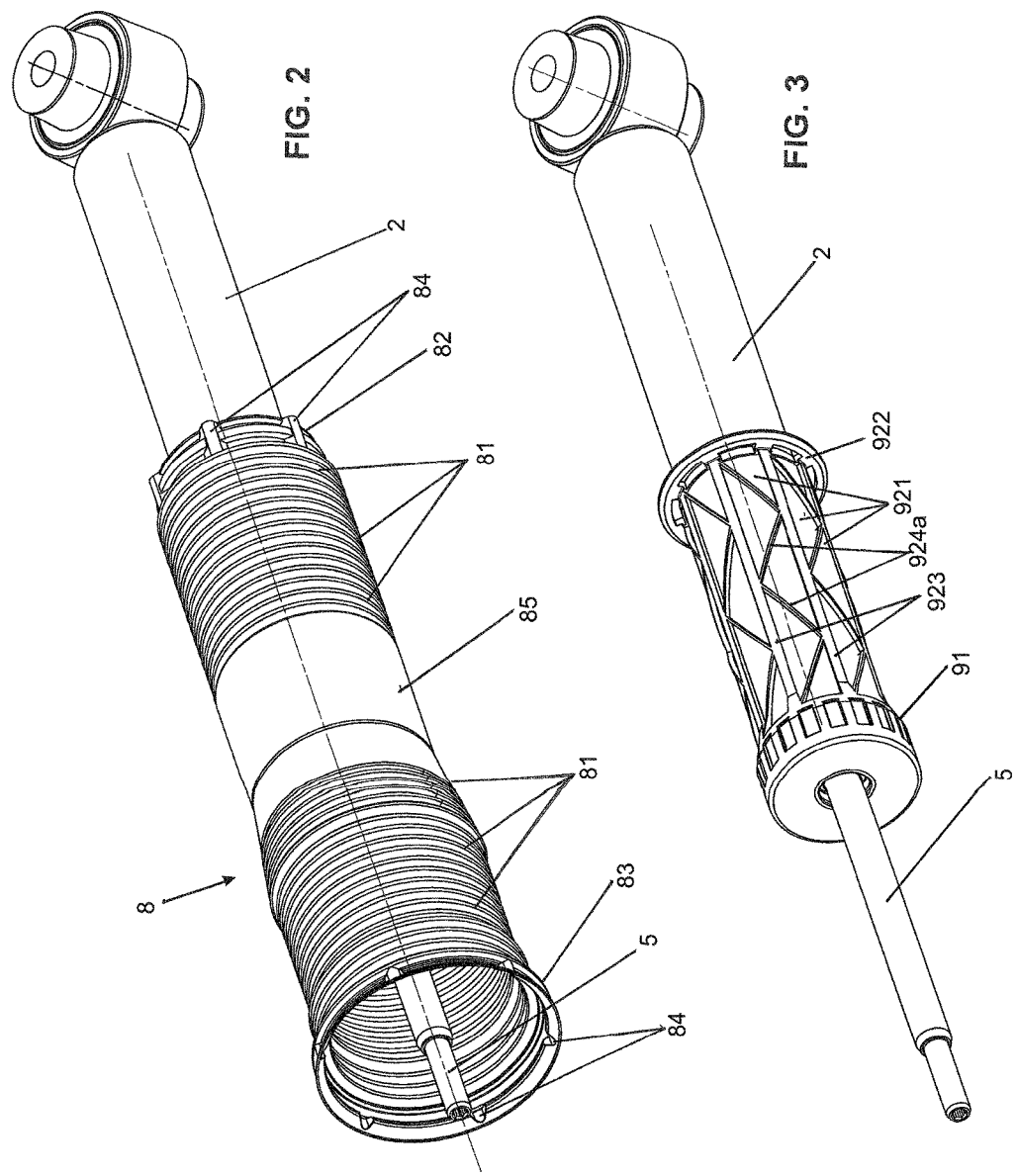

HYDRAULIC DAMPER WITH A PISTON ROD PROTECTIVE TUBE

RELATED APPLICATIONS

This application claims the benefit of U.S. Provisional Application No. 62/352,737 filed Jun. 21, 2016.

STATEMENT REGARDING FEDERALLY SPONSORED RESEARCH

NONE.

TECHNICAL FIELD

The present invention relates to a hydraulic damper with a piston rod protector, and more particularly to a piston rod protector that is partially elastic to allow it to move as the piston rod moves.

BACKGROUND OF THE INVENTION

In the design of many hydraulic dampers a protective tube protects the piston rod from damage while it is sliding within the piston rod guide and prevents dust or other kinds of debris from being deposited onto the piston rod surface as these debris might in turn damage the piston rod guide leading to damper leakage. In order to provide space for the compressed protective tube during the damper compression stroke its end must be attached to the damper at a certain distance from the piston rod guide. It has been known to snap an axial end of the protective tube into an annular groove machined in the wall of the damper tube or in a sleeve fixed in such a groove to accomplish this need. Such a solution, however, may not be applied to thin walled damper tubes as it would substantially decrease the durability and mechanical properties of the damper tube.

It is also known to use tubular protective plastic caps having a first axial end attached to the piston rod guide and a second axial end providing locking for the end of the protective tube. Such caps must obviously feature a sufficient axial stiffness and high critical load buckling properties to maintain their position on the damper while withstanding forces transmitted by the expanding or contracting protective tube. If these features were not present the caps would themselves scratch and damage the surface of the damper tube, which is usually covered by some anti-corrosive paint.

Patent application DE10122796 discloses a vibration damper with a corrugated protective tube surrounding the piston rod and attached at its first axial end to a stop buffer and at its second axial end to a relatively short, solid protective cap. The stop buffer, the protective tube and the protective cap form a preassembled unit and the protective cap is provided with a radially elastic edge to facilitate its connection to the protective tube. Such a radially elastic edge may be achieved by providing the cap with axially extending slots dividing the edge into individual segments. A similar short protective cap is also disclosed in the patent application DE9109020. The slots over the edge of the cap also form a number of annular openings between the damper tube and the protective tube to allow for air flow in or out of the closed space in the protective tube during its expansion or contraction, respectively.

It is one object of the present invention to provide a hydraulic damper with a protective cap of a substantial length thereby providing sufficient space for the contracted protective tube, which also has a simple and cost efficient construction, as well as improved axial and torsional stiffness and high critical load buckling properties.

SUMMARY OF THE INVENTION

The present invention relates to a hydraulic damper, in particular a motor vehicle hydraulic suspension damper, comprising a tube, inside of which a piston assembly is slidably disposed and attached to an internal end of a piston rod, which is led outside the tube through a sealed piston rod guide. A substantially tubular protective cap has a cylindrical section that surrounds the piston rod guide and an openwork section that surrounds a portion of the tube. The protective cap has an axial end distant from the piston rod guide. An at least partially axially elastic protective tube surrounds the piston rod and the portion of the tube surrounded by the protective cap and it has a first axial end attached to the axial end of the protective cap that is distant from the piston rod guide.

Preferably the protective cap is a single unitary plastic component having a cylindrical section surrounding the piston rod guide, an openwork section surrounding the portion of the tube and an annular flange provided with a locking means enabling it to attach to the first axial end of the protective tube. The openwork section includes a plurality of, preferably equiangularly spaced, axial ribs joining the cylindrical section with the flange and separated by axial slots and a number of auxiliary ribs joining the axial ribs. Preferably, an annular area of the axial slots is larger than a total annular area of the axial ribs and the auxiliary ribs combined. The cylindrical section and the axial ribs and auxiliary ribs adjoin the damper tube.

The openwork section of the protective cap provides high axial and torsional stiffness, as well as a high critical load buckling property to the protective cap. It also largely reduces overheating and minimizes material consumption.

protective cap is preferably frictionally fitted onto the damper tube. Preferably a ratio of an internal length (L) of the protective cap to the external diameter (D) of the tube is equal to or greater than 3 and preferably the internal length (L) of the protective cap is more than 30% of an internal length ($L_D$) of the tube. These dimensions provided a sufficient space for the contracted protective tube.

In some preferred embodiments of the present invention, the auxiliary ribs are either slanted at an angle to or substantially perpendicular to the axial ribs. The locking means of the annular flange of the protective cap preferably has a form of an edge enabling it to snap into an annular internal recess provided at the first axial end of the protective tube. with a plurality of annular slots allowing for air flow there through during operation of the damper.

The axial elasticity of the protective tube is preferably provided by at least two sets of annular corrugations separated by a tubular section in the protective tube. The damper further preferably comprises a top mount attached to an external end of the piston rod and a second axial end of said protective tube.

BRIEF DESCRIPTION OF THE DRAWINGS

The invention shall be described and explained below in connection with the attached drawings on which:

FIG. 2 is a schematic perspective view of the damper and piston rod protective tube shown in FIG. 1 without a top mount;

FIG. 3 is a schematic perspective view of the damper shown in FIG. 1 without the protective tube;

DETAILED DESCRIPTION OF PREFERRED EMBODIMENTS

Figure 1:
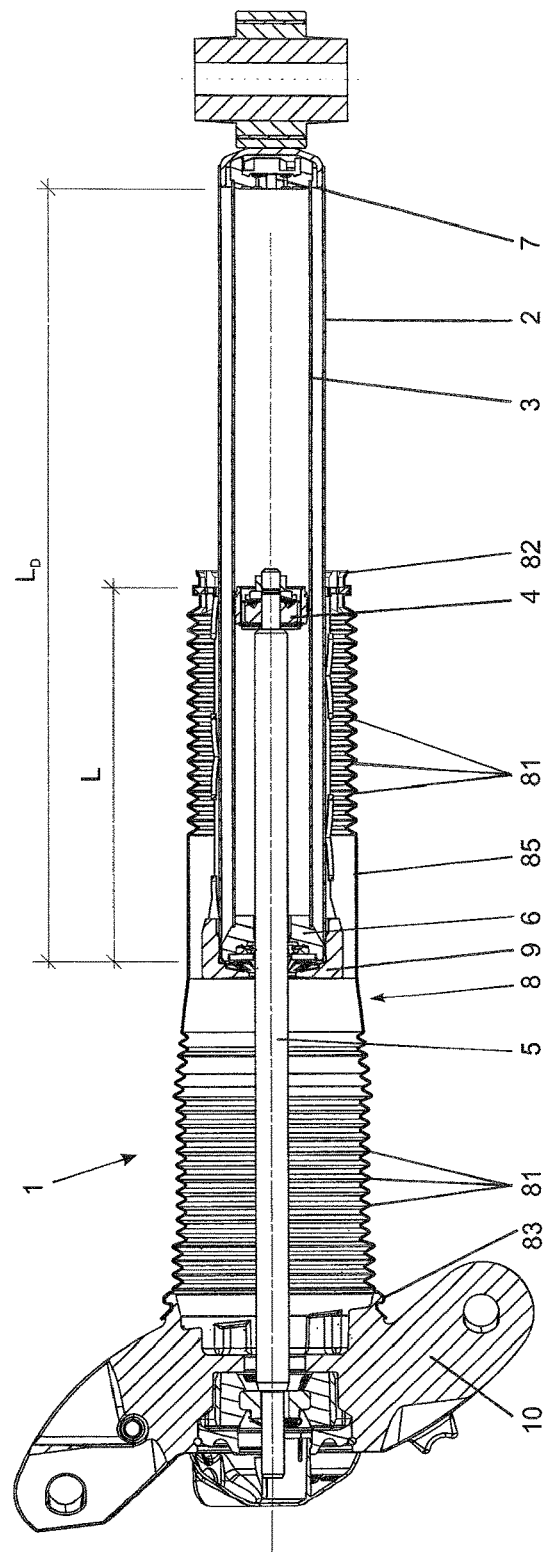
FIG. 1 is a schematic cross-sectional view of a twin-tube damper provided with a piston rod protective tube according to the present invention.
Figure 4A:
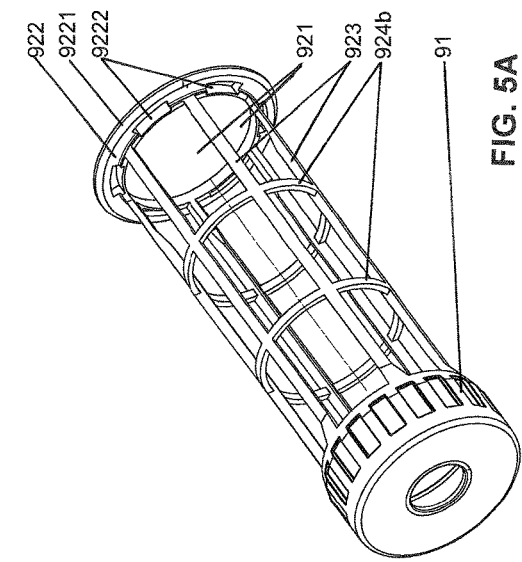
FIG. 4A and FIG. 4B show an embodiment of the protective cap shown in FIG. 1, the cap is shown in a schematic perspective view in FIG. 4A and in an axial cross-sectional view in FIG. 4B.
Figure 4B:
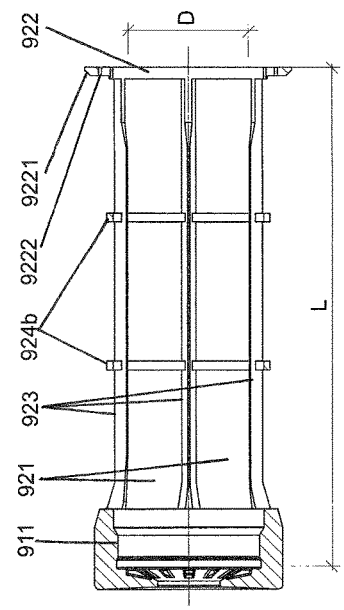

FIG. 1-3 present an embodiment of a twin-tube damper 1 according to the present invention that may be employed in a typical motor vehicle suspension. The damper 1 comprises a tube 2 inside of which a movable piston assembly 4 is slidably disposed. As this embodiment relates to a twin-tube damper, the damper 1 also comprises an internal tube 3 filled with a viscous working liquid and providing guidance for the piston assembly 4 attached to a piston rod 5, which is led outside the damper 1 through a sealed piston rod guide 6. The damper 1 is also provided with a base valve assembly 7 fixed at the other end of the tubes 2 and 3. Obviously the invention is equally applicable to mono-tube dampers.

The damper 1 further comprises an axially elastic plastic protective tube 8 that surrounds the piston rod 5 and prevents dust and other debris from being deposited on its surface. In this embodiment axial elasticity of the protective tube 8 is provided by two sets of annular corrugations 81 separated by a tubular section 85.

The first axial end 82 of the protective tube 8 is attached to a plastic protective cap 9, while the second axial end 83 is attached to a top mount 10 of the damper 1.

The protective cap 9 is a single plastic component, meaning a unitary design, having at its first axial end a cylindrical section 91 joined to an openwork section 92 that is terminated with an annular flange 922 provided at a second axial end of the cap 9 distant from the piston rod guide 6 and cylindrical section 91. The embodiments of the protective cap 9 are shown best in FIG. 3-FIG. 5B.

The openwork section 92 is formed by a plurality of, preferably six, equiangularly spaced narrow axial ribs 923 that join the cylindrical section 91 to a flange 922. The axial ribs 923 are separated by a plurality of axial slots 921. In order to improve axial and torsional stiffness, as well as critical load buckling of the protective cap 9, it is also provided with auxiliary ribs 924a or 924b that join the axial ribs 923. In the embodiment shown in FIG. 4A and FIG. 4B, a plurality of slanted auxiliary ribs 924a, preferably four, join each pair of axial ribs 923.

In order to avoid overheating and to reduce material consumption the annular area covered by the axial slots 921 is larger than the total annular area covered by the axial ribs 923 and the auxiliary ribs 924a or 924b combined.

The protective cap 9 is frictionally fixed onto the external damper tube 2 in a one-step assembly stage by sliding it onto the damper tube 2 optionally along with the protective tube 8. Therefor both the cylindrical section 91 and the axial ribs 923 tightly fit on the damper tube 2. Additional friction fit between the protective cap 9 and the tube 2 is also provided by a radially inner annular projection 911, see FIG. 4B and FIG. 5B, shaped in the cylindrical section 91 in the area of the piston rod guide 6.

Figure 5A:
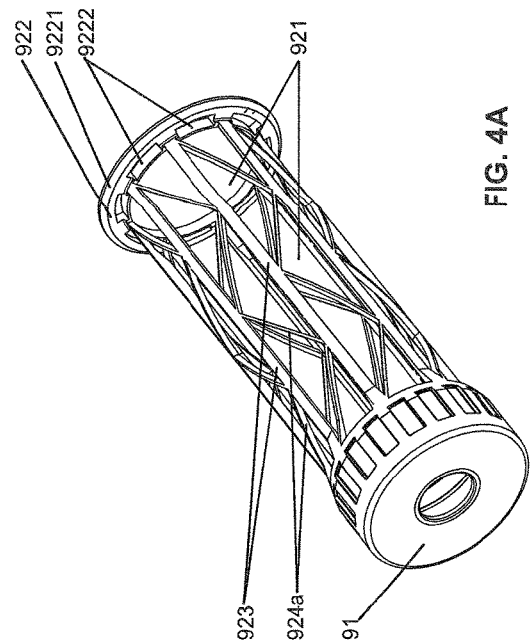
FIG. 5A and FIG. 5B show another embodiment of a protective cap in a schematic perspective view in FIG. 5A and in an axial cross-sectional view in FIG. 5B.
Figure 5B:
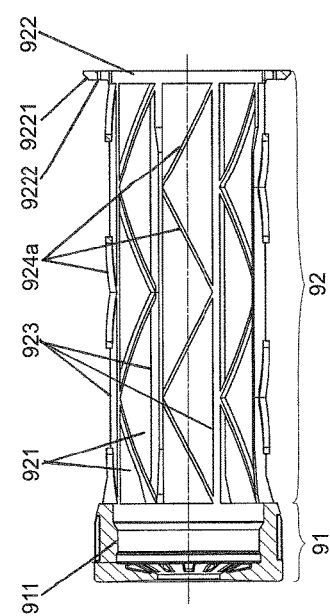

In order to provide a sufficient space for the protective tube 8 when it is compressed during damper 1 operation, the internal length L of the protective cap 9 adjoining the damper tube 2 is at least three times longer than the external diameter D of the damper tube 2, see FIG. 5B. Also, as shown in FIG. 1 the internal length L of the cap 9 is more than 30% of the working internal length $L_D$ of the damper tube 2 intended for a sliding movement of the piston assembly 4. This design allows one to employ a protective tube 8 being only partially elastic as the space provided by the length L of the cap 9 is sufficient to compensate the contraction/compression of the protective tube 8 along with its tubular section 85.

The flange 922 of the protective cap 9 is also provided with a conical edge 9221, see FIG. 4A-FIG. 5B, enabling it to snap the first axial end 82 of the protective tube 8 onto itself thereby connecting the first axial end 82 to the protective cap 9. The flange 922 further includes a plurality, preferably six, of equiangularly spaced annular slots 9222 to allow for air flow there through during operation of the damper 1. Both axial ends 82 and 83 of the protective tube 8 are also provided with a plurality, preferably six, of additional equiangularly spaced slots 84 to allow for air flow there through, see FIG. 2.

In an embodiment of the protective cap 9 illustrated in FIG. 5A and FIG. 5B the protective cap 9 is provided with auxiliary ribs 924b that are oriented perpendicular to the axial ribs 923. A plurality, preferably two, equidistantly disposed auxiliary ribs 924b join the axial ribs 923 improving stiffness of the protective cap 9.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

I claim:

1. A hydraulic damper for a motor vehicle comprising:
    a damper tube, inside of which a piston assembly is slidably disposed and attached to an internal end of a piston rod, which is led outside said damper tube through a sealed piston rod guide;
    a substantially tubular protective cap comprising a cylindrical section surrounding said piston rod guide, an openwork section surrounding a portion of said tube and further having an axial end distant from said piston rod guide;
    an at least partially axially elastic protective tube surrounding said piston rod and said openwork section and having a first axial end attached to said axial end of said protective cap that is distant from said piston rod guide;
    said protective cap being a unitary plastic component and further having an annular flange provided with a locking means enabling it to attach to said first axial end of said protective tube;
    said openwork section comprising a plurality of spaced axial ribs which join said cylindrical section to said annular flange, said axial ribs separated by axial slots, a plurality of auxiliary ribs joining said axial ribs, wherein an annular area of said axial slots is larger than a total annular area of said axial ribs and said auxiliary ribs combined; and
    said cylindrical section and said openwork section axial ribs and auxiliary ribs adjoined to said damper tube, wherein said auxiliary ribs are slanted at an angle with respect to said axial ribs.

2. The damper according to claim 1, wherein said protective cap is frictionally fitted to said damper tube.

3. The damper according to claim 1, wherein a ratio of an internal length (L) of said protective cap to an external diameter (D) of said damper tube is equal to or greater than 3.

4. The damper according to claim 3, wherein said internal length (L) of said protective cap is more than 30% of an internal length (LD) of said damper tube.

5. The damper according to claim 1, wherein said auxiliary ribs are oriented substantially perpendicularly relative to said axial ribs.

6. The damper according to claim 1, wherein said locking means of said annular flange of said protective cap has a form of an edge enabling it to snap into an annular internal recess provided at said first axial end of said protective tube.

7. The damper according to claim 1, wherein said annular flange of said protective cap is further provided with a plurality of annular slots allowing for air flow there through during operation of said damper.

8. The damper according to claim 1, wherein said at least partial axial elasticity of said protective tube is provided by at least two sets of annular corrugations in said protective tube separated by a tubular section.

9. The damper according to claim 1, wherein said damper further comprises a top mount attached to an external end of said piston rod and to a second axial end of said protective tube.

\* \* \* \* \*